June 27, 1950  C. E. BARKALOW  2,512,598
GYROSCOPIC INSTRUMENT
Filed July 21, 1948

INVENTOR
CLARE E. BARKALOW
BY
Herbert H. Thompson
his ATTORNEY.

Patented June 27, 1950

2,512,598

UNITED STATES PATENT OFFICE 2,512,598

GYROSCOPIC INSTRUMENT

Clare E. Barkalow, Lloyds Harbor, N. Y., assignor to The Sperry Corporation, Great Neck, N. Y., a corporation of Delaware Application July 21, 1948, Serial No. 39,829

15 Claims. (Cl. 74—5.6)

This invention relates to gyroscopic instruments and particularly concerns a device of this character utilizing a fixed light sensitive member for controlling the operation of a torque motor, or other electrical device.

One of the features of the present invention is to provide an axially directed light projecting and reflecting system with the light sensitive member that is adapted to detect relative tilt of the gyroscopic parts about an axis thereof. An object of the invention is to reduce the number of slip rings necessary in a device of this character to decrease the axial frictional restraint thereon and thus improve the operational characteristics of the device.

Another feature of the invention resides in the provision of an axially open gimbal ring in the gyroscopic structure through which light is both projected and reflected.

A further feature of the invention resides in the utilization of a gyroscopic rotor case with a light reflecting surface thereon normally positioned with a portion of its area adjacent the opening in the gimbal ring and arranged so that the light reflectivity thereof adjacent the opening increases or decreases upon relative tilt of the case and ring.

Figure 1:
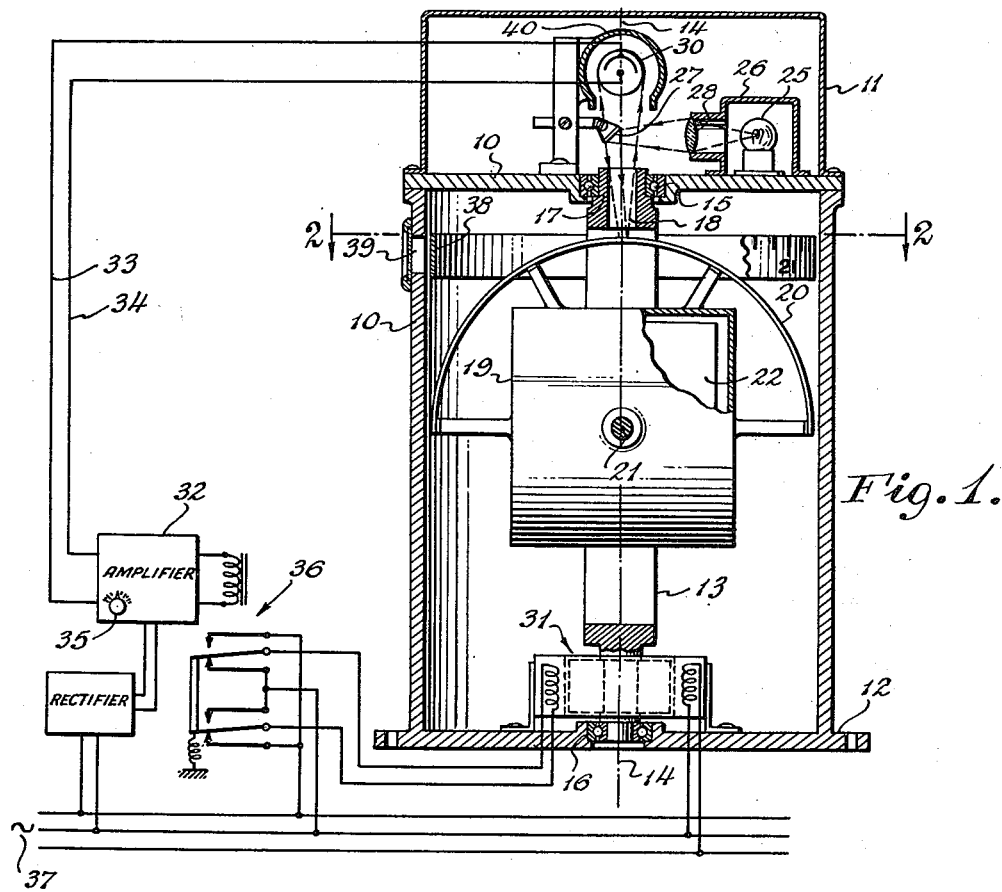
Figure 2:
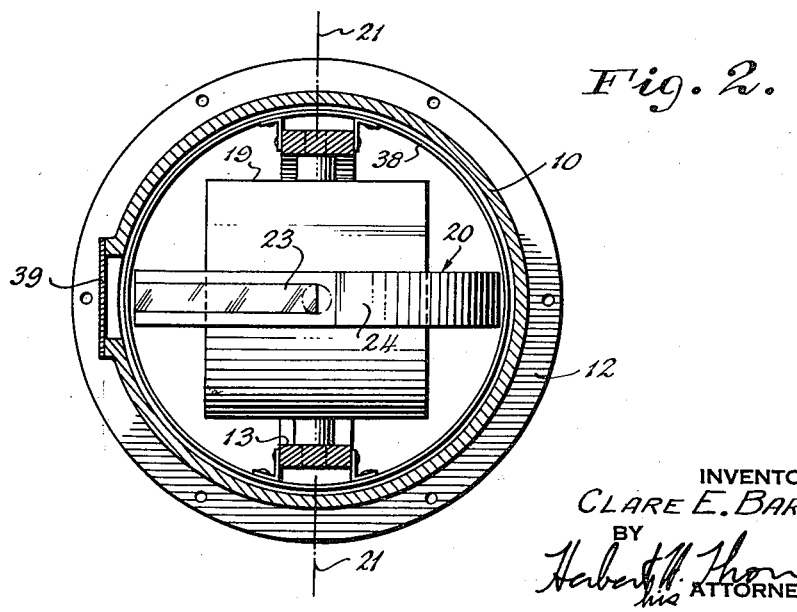

Other objects, features and structural details of the invention will be apparent from the following description when read in connection with the accompanying drawing, wherein, Fig. 1 is a schematic view and wiring diagram showing a gyroscopic instrument of the directional gyro type embodying the present inventive concepts. In this view, the housing of the device is in vertical section to show the interior gyroscopic and associated parts;

Fig. 2 is a section view of the improved device taken on line 2—2, Fig. 1.

With reference to the drawing, the gyroscopic instrument shown includes a housing or frame 10 having a cover 11 mounted thereon. As shown, the frame 10 is provided with a flanged base 12 having suitable openings therein to facilitate mounting the same in a fixed position in a desired location on a dirigible craft (not shown). The device further includes a gimbal ring 13 mounted in the frame 10 with freedom about an axis such as the vertical axis 14 by means of the top and bottom bearings respectively indicated at 15 and 16. In accordance with the invention, the trunnion 17 of the vertical ring 13 engaging the bearing 15 is provided with an opening 18 along the axis 14 of the instrument. The axial opening 18 in the metallic gimbal ring 13 preferably has a polished cylindrical surface to prevent absorption of any of the light passing therethrough.

The instrument also includes a rotor case indicated at 19 that is mounted on ring 13 with freedom about a second or horizontal axis 21, Fig. 2. The axes 14 and 21 of the gyroscopic instrument are mutually perpendicular. The pivotal connection between the case 19 and the ring 13 is obtained by means of suitable trunnions that extend horizontally from opposite sides of the case 19 to engage suitable bearings (not shown) in the ring. As shown, the rotor case 19 supports a gyroscopic rotor 22 to spin about an axis that is perpendicular to both axes 14 and 21. In the normal position of the instrument, the position of the case 19 relative to the ring 13 about axis 21 is such that the spin axis of the rotor 22 is horizontal as viewed in Fig. 1 of the drawing. The rotor 22 may be spun by an electric motor (not shown). The device is shown in its normal position in Fig. 1 and Fig. 2. As shown, the rotor case 19 includes a curved metallic cylindrical shell 20 fixed thereto. The shell 20 has a polished arcuate area thereon of a width corresponding substantially to the diameter or width of the axial opening 18 in the gimbal ring 13. The polished area of the shell 20 provides a light reflecting surface as indicated at 23. In the present instance, the remainder of the shell 20 is painted black to provide a light absorbing surface 24.

The contiguous portions of the surfaces 23 and 24 at the top of the curved shell 20 are normally positioned as shown in Fig. 2 with substantially equal areas of the respective surfaces adjacent the axial opening in the ring 13. The surfaces 23 and 24 are arranged on the case 19 to present a larger area of one and a smaller area of the other adjacent the axial opening 18 upon relative tilt of the case 19 and ring 13 from the normal position thereof about axis 21. The direction of tilt of the parts about axis 21 determines whether more or less of the reflecting surface 23 is present at the opening 18. If desired, the light absorbing surface 24 of the arrangement could be provided by a painted area similar to surface 23 on the opposite side of the shell. Further, the light reflecting surface 23 of the case is normally positioned with a portion of its area adjacent the opening 18 in the ring, the arrangement being such that the light reflectivity of the surface adjacent the opening increases or decreases upon relative tilt of the case 19 and ring 13 about axis 21.

In accordance with the invention, means are provided for projecting light through the axial opening 18 in the ring 13 along axis 14 on the light reflecting and light absorbing surfaces of the rotor case. As shown, this means includes a light source such as an electric light bulb 25 fixed to frame 10 by means of housing 26. The system further includes a mirror 27 fixed to the frame 10 and positioned to project light from the light source 25 by way of lens 28 through the axial opening 18. The light sensitive means adapted to receive the light reflected through opening 18 from the surface 23 of the case comprises a photoelectric cell 30 fixed to the frame 10 on the axis 14 of the gimbal ring of the device. As shown, the cell 30 is located in a shield 40 also fixed to the frame 10.

The instrument also includes a torque motor 31 adapted to exert a torque about axis 14 of the device to precess the case 19 about axis 21 to maintain the same in a substantially level condition. The means provided for operatively connecting the cell 30 and motor 31 includes a D. C. amplifier 32 adapted to receive the output of the cell by way of leads 33, 34. The gain of the amplifier may be adjusted by the setting of knob 35. Amplifier 32, as shown, is connected to the relay winding of a D. C. relay 36. The armature of the relay is spring biased and the relay serves to control reversible torquing motor 31 which acts about the vertical axis of ring 13 in a direction to reduce the tilt of casing 19 about axis 21. As shown said relay 36 serves to reverse the phase of the current supplied to one of the field windings of motor 31 from a two-phase supply 37, the other winding of said motor being connected to the other phase of said supply so that the motor is continuously operative to precess the rotor case 19 in the proper direction to maintain the same in an average level condition. When the case 19 is precessed so that the area of the light reflecting surface 23 at opening 18 is greater than that of the light absorbing surface 24, the output of cell 30 and consequently amplifier 32 increases to the extent necessary to overcome the spring bias of the relay 36 and cause the torque motor to reverse. This precesses the case in the opposite direction until the output of amplifier 32 diminishes to such an extent as to permit the spring biased armature of the relay to return to its initial position.

Amplifier 32 and relay 36 are actually mounted on the top of frame 10 and the cover 11 of the device houses the same together with the light source 25, mirror 27 and cell 30.

As shown, the instrument also includes a compass card 38 fixedly mounted on ring 13. The card 38 is readable through a window 39 in the frame 10.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a gyroscopic instrument, the combination of, a frame, a gimbal ring mounted on the frame with freedom about a first axis having an axial opening therein, a rotor case mounted on the ring with freedom about a second axis perpendicular to the first axis having contiguous light reflecting and light absorbing surfaces normally positioned with substantially equal areas of the surfaces adjacent the opening in the ring, said surfaces being arranged on the case to present a larger area of one and a smaller area of the other adjacent the opening in the ring upon relative tilt of the case and ring from the normal position thereof about the second axis, means fixed to the frame for projecting light through the opening in the gimbal ring on the light reflecting and light absorbing surfaces of the case, and a photoelectric cell fixed to the frame in a position to receive the light reflected through the opening in the gimbal ring from the light reflecting surface of the case.

2. In a gyroscopic instrument, the combination of, a frame, a gimbal ring mounted on the frame with freedom about a first axis having an axial opening therein, a rotor case mounted on the ring with freedom about a second axis perpendicular to the first axis having contiguous light reflecting and light absorbing surfaces normally positioned with substantially equal areas of the surfaces adjacent the opening in the ring, said surfaces being arranged on the case to present a larger area of one and a smaller area of the other adjacent the opening in the ring upon relative tilt of the case and ring from the normal position thereof about the second axis, a light source fixed to the frame, a mirror fixed to the frame and positioned to project light from the light source through the opening in the gimbal ring on the light reflecting and light absorbing surfaces of the case, and a photoelectric cell fixed to the frame on the axis of the ring to receive the light reflected through the opening in the ring from the light reflecting surface of the case.

3. In a directional gyro, the combination of, a frame, a gimbal ring mounted on the frame with freedom about a vertical axis having an axial opening therein, a rotor case mounted on the ring with freedom about a horizontal axis having contiguous light reflecting and light absorbing surfaces normally positioned with substantially equal areas of the surfaces adjacent the opening in the ring, said surfaces being arranged on the case to present a larger area of one and a smaller area of the other adjacent the opening in the ring upon relative tilt of the case and ring from the normal position thereof about the horizontal axis, means fixed to the frame for projecting light through the opening in the gimbal ring on the light reflecting and light absorbing surfaces of the case, and a photoelectric cell fixed to the frame in a position to receive the light reflected through the opening in the gimbal ring from the light reflecting surface of the case.

4. In a directional gyro, the combination of, a frame, a gimbal ring mounted on the frame with freedom about a vertical axis having an axial opening therein, a rotor case mounted on the ring with freedom about a horizontal axis having contiguous light reflecting and light absorbing surfaces normally positioned with substantially equal areas of the surfaces adjacent the opening in the ring, said surfaces being arranged on the case to present a larger area of one and a smaller area of the other adjacent the opening in the ring upon relative tilt of the case and ring from the normal position thereof about the horizontal axis, a light source fixed to the frame, a mirror fixed to the frame and positioned to project light from the light source through the opening in the gimbal ring on the light reflecting and light absorbing surfaces of the case, and a photoelectric cell fixed to the frame on the axis of the ring to receive the light reflected through the opening in the ring from the light reflecting surface of the case.

5. In a gyroscopic instrument, a gimbal ring with freedom about an axis having an axial opening, and a rotor case mounted on the ring with freedom about a second axis perpendicular to the first axis having contiguous light reflecting and light absorbing surfaces normally positioned with substantially equal areas of the surfaces adjacent the opening in the ring.

6. An instrument as claimed in claim 5, in which the rotor case includes a metallic curved shell having a polished arcuate area thereon of a width corresponding to the width of the opening in the gimbal ring to provide the light reflecting surface and the remainder of the shell is painted black.

7. In a directional gyro, a gimbal ring with freedom about a vertical axis having an axial opening, and a rotor case mounted on the ring with freedom about a horizontal axis having contiguous light reflecting and light absorbing surfaces normally positioned with substantially equal areas of the surfaces adjacent the opening in the ring.

8. In a gyroscopic instrument, a frame, a gimbal ring mounted on the frame with freedom about an axis having an axial opening therein, means fixed to the frame for projecting light through the opening in the ring, and a photoelectric cell fixed to the frame in a position to receive light reflected through the opening in the ring.

9. An instrument as claimed in claim 8, in which the axial opening in the ring has a polished cylindrical surface.

10. In a directional gyro, a frame, a gimbal ring mounted on the frame with freedom about a vertical axis having an axial opening therein, means fixed to the frame for projecting light through the opening in the ring, and a photoelectric cell fixed to the frame in a position to receive light reflected through the opening in the ring.

11. A gyroscopic instrument comprising a frame, a gimbal ring mounted on the frame with freedom about a first axis having an axial opening therein, means for exerting a torque about the first axis, a rotor case mounted on the ring with freedom about a second axis perpendicular to the first axis having contiguous light reflecting and light absorbing surfaces normally positioned with equal areas of the surfaces adjacent the opening in the ring, means fixed to the frame for projecting light through the opening in the ring on the light reflecting and light absorbing surfaces of the case, a photoelectric cell fixed to the frame in a position to receive the light reflected through the opening in the gimbal ring from the light reflecting surface of the case, and means for operatively connecting said photoelectric cell and torque exerting means to maintain said rotor case properly positioned about its axis.

12. A directional gyro comprising a frame, a gimbal ring mounted on the frame with freedom about a vertical axis having an axial opening therein, means for exerting a torque about the vertical axis, a rotor case mounted on the ring with freedom about a horizontal axis having contiguous light reflecting and light absorbing surfaces normally positioned with equal areas of the surfaces adjacent the opening in the ring, means fixed to the frame for projecting light through the opening in the gimbal ring on the light reflecting and light absorbing surfaces of the case, a photoelectric cell fixed to the frame in a position to receive the light reflected through the opening in the gimbal ring from the light reflecting surface of the case, and means for operatively connecting said photoelectric cell and torque exerting means to maintain said rotor case in a substantially level condition about its axis.

13. In a gyroscopic instrument, a gimbal ring with freedom about an axis having an axial opening, and a rotor case mounted on the ring with freedom about a second axis perpendicular to the first axis having a light reflecting surface thereon normally positioned with a portion of its area adjacent the opening in the ring, said surface being arranged in the case so that the light reflectivity thereof adjacent the opening increases or decreases upon relative tilt of the case and ring.

14. In a directional gyro, a gimbal ring with freedom about a vertical axis having an axial opening therein, and a rotor case mounted on the ring with freedom about a horizontal axis having a light reflecting surface thereon normally positioned with a portion of its area adjacent the opening in the ring, said surface being arranged on the case so that the light reflectivity theerof adjacent the opening increases or decreases upon relative tilt of the case and ring.

15. In a sensitive instrument mounted for freedom about inner and outer axes, a hollow trunnion supporting said instrument about its outer axis, a stationary light source for directing a beam through said trunnion, a surface on said instrument in the path of said beam whose light reflectivity increases or decreases with tilt of the instrument from a normal position about its inner axis, and a stationary photoelectric cell for receiving the beam reflected from said surface through said hollow trunnion.

CLARE E. BARKALOW.

REFERENCES CITED

The following references are of record in the file of this patent:

UNITED STATES PATENTS

| Number | Name | Date |
|---|---|---|
| 1,998,948 | Wittkuhns et al. | Apr. 23, 1935 |
| 1,999,646 | Wittkuhns | Apr. 30, 1935 |
| 2,393,473 | Jones | Jan. 22, 1946 |